(12) United States Patent
Klump

(10) Patent No.: US 6,981,554 B1
(45) Date of Patent: Jan. 3, 2006

(54) EXPANDABLE FIRE-FIGHTING FLUID CONTAINER

(76) Inventor: James A. Klump, P.O. Box 5, Forbestown, CA (US) 95941

( * ) Notice: Subject to any disclaimer, the term of this patent is extended or adjusted under 35 U.S.C. 154(b) by 126 days.

(21) Appl. No.: 10/661,151

(22) Filed: Sep. 13, 2003

(51) Int. Cl.
*A62C 25/00* (2006.01)
*B65D 6/12* (2006.01)

(52) U.S. Cl. ............... 169/51; 169/52; 220/6; 220/8; 220/666; 220/675; 220/4.12

(58) Field of Classification Search .............. 220/6, 220/8, 666, 669, 670, 675, 4.12; 169/51, 169/52; 296/37.5; 280/4, 830–839; 222/666
See application file for complete search history.

(56) References Cited

U.S. PATENT DOCUMENTS

| | | | |
|---|---|---|---|
| 2,952,379 A * | 9/1960 | Potter | 220/6 |
| 3,084,825 A * | 4/1963 | Hultquist | 220/8 |
| 3,088,771 A * | 5/1963 | Weigle | 296/37.5 |
| 3,527,339 A * | 9/1970 | Cipolla | 206/290 |
| 3,661,211 A * | 5/1972 | Powers | 169/53 |
| 4,214,721 A * | 7/1980 | Burhans et al. | 244/135 B |
| 5,052,319 A * | 10/1991 | Beyrouty | 114/74 T |
| 5,263,601 A * | 11/1993 | Borow | 220/6 |
| 6,158,521 A * | 12/2000 | Klump | 169/30 |

* cited by examiner

*Primary Examiner*—David A. Scherbel
*Assistant Examiner*—Seth Barney
(74) *Attorney, Agent, or Firm*—Jack Lo

(57) ABSTRACT

An expandable fire-fighting fluid container is arranged for receiving a fire fighting fluid. The container is comprised of end walls, a bottom between the end walls, and movable side walls connected to the end walls and the bottom with expandable seals. Actuators are attached between the side walls and the end walls. The actuators are powered by an engine attached to the container. The side walls are retractable inward for reducing container width for traveling on public roads, and expandable outward for increasing fluid capacity at a fire site. A pump is attached to the container for pumping the fluid to douse a fire.

13 Claims, 3 Drawing Sheets

EXPANDABLE FIRE-FIGHTING FLUID CONTAINER

BACKGROUND OF THE INVENTION

1. Field of the Invention:

This invention relates generally to portable fire-fighting devices for fighting fires in remote locations.

2. Prior Art:

In the fight against wild fires, firefighters are supplied with portable water tanks transported by truck or helicopter. The tanks are usually filled by helicopter at the fire site. The equipment for pumping water from the tanks, such as engine-driven pumps, hoses, etc., are usually ordered as necessary and transported separately from the tanks. Due to logistical difficulties in the transmission and filling of such orders, the tanks and associated equipment often arrive at widely different times, so that the fire fighting effort is significantly delayed. Even when the all the pieces are gathered, they are time consuming to assemble and connect together. Further, the water tanks are limited to a maximum width of 8 feet for being towed on standard roads. The width limit thus limits the maximum water capacity.

OBJECTS OF THE INVENTION

Accordingly, objects of the present fire-fighting container are:

- to be transportable by wheeled vehicle or helicopter to a fire at any location;
- to be easily refillable by helicopter or a nearby water source for prolonged operation;
- to be fully self-contained with all the necessary equipment;
- to be compactable for being towed on roads; and
- to be expandable at the fire site for increasing water capacity.

Further objects of the present invention will become apparent from a consideration of the drawings and ensuing description.

BRIEF SUMMARY OF THE INVENTION

An expandable fire-fighting fluid container is arranged for receiving a fire fighting fluid. The container is comprised of end walls, a bottom between the end walls, and movable side walls connected to the end walls and the bottom with expandable seals. Actuators are attached between the side walls and the end walls. The actuators are powered by an engine attached to the container. The side walls are retractable inward for reducing container width for traveling on public roads, and expandable outward for increasing fluid capacity at a fire site. A pump is attached to the container for pumping the fluid to douse a fire.

DRAWING REFERENCE NUMERALS

| | |
|---|---|
| 10. Container | 11. End Wall |
| 12. Bottom | 13. Side Wall |
| 14. Expandable Seal | 15. Actuator |
| 16. Compartment | 17. Vertical Plate |
| 18. Horizontal Plate | 19. Bellows |
| 20. Engine | 21. Pump |
| 22. Valve | 23. Foam Tank |
| 24. Foam Proportioner | 25. Pump |
| 26. Leveling System | 27. Air Compressor |
| 28. Pontoons | |

DETAILED DESCRIPTION OF THE INVENTION

Figure 1:
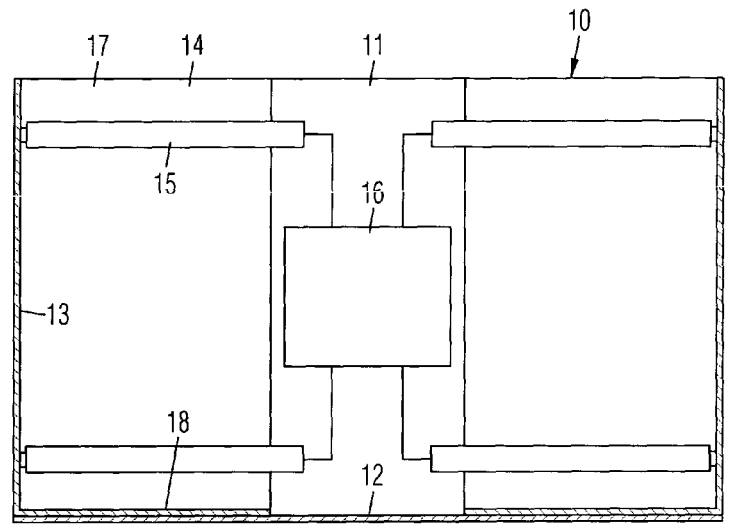
FIG. 1 is an end sectional view of the present expandable fire-fighting fluid container in a compacted condition.

FIGS. 1–2:

An expandable fire-fighting fluid container 10 is shown in an end sectional view in FIG. 1. Container 10 includes end walls 11 (one shown), a bottom 12 between end walls 11, and movable side walls 13 between end walls 11. End walls 11 are preferably fixedly attached to bottom 12. Side walls 13 are connected to end walls 11 and bottom 12 with expandable seals 14. Actuators 15 are attached between side walls 13 and end walls 11. Container 10 is rectangular in this example, but it may be of another shape. There may be any number of actuators 15, which are powered by an engine in an equipment compartment 16 in container 10. In this example, actuators 15 are comprised of hydraulic jacks, but they may be another type of actuator, such as electric actuators. Side walls 13 are expandable outward by actuators 15 for increasing fluid capacity, and retractable inward for reducing container width for traveling on public roads.

Figure 2:
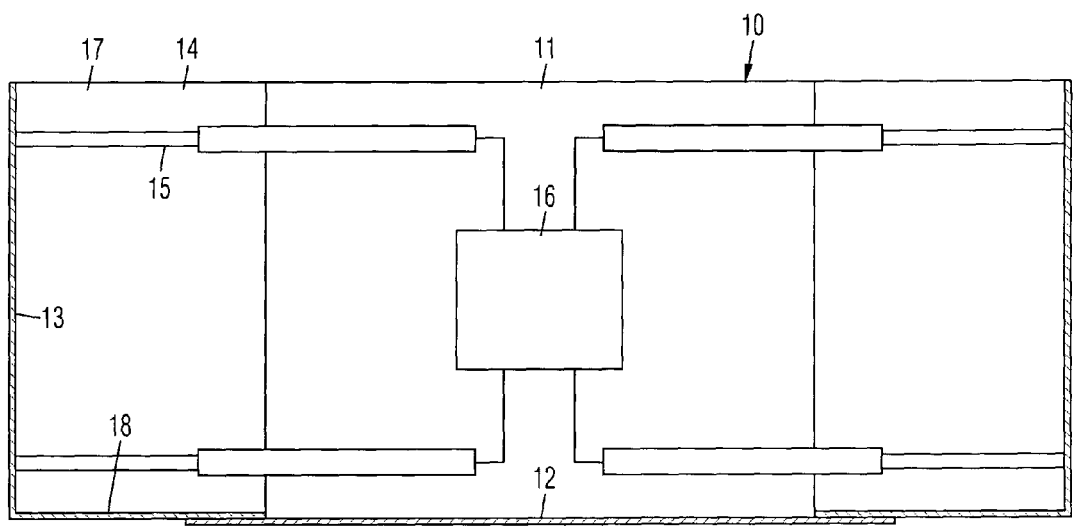
FIG. 2 is an end sectional view thereof in an expanded condition.
Figure 3:
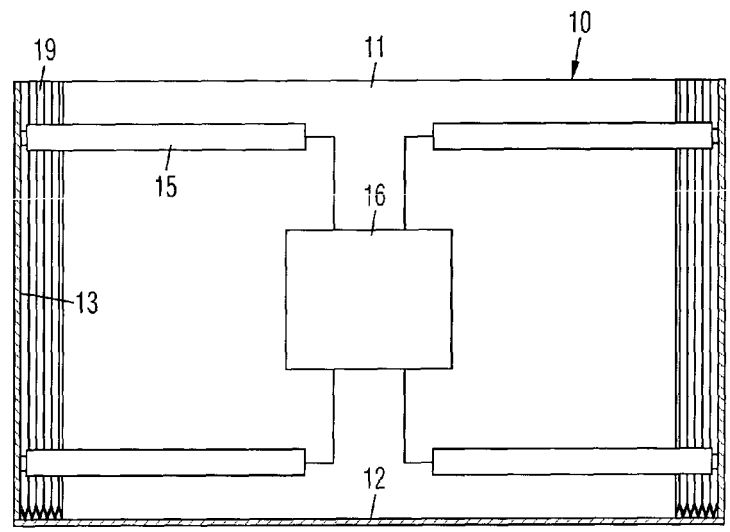
FIG. 3 is an end sectional view of an alternative embodiment thereof in a compacted condition.
Figure 4:
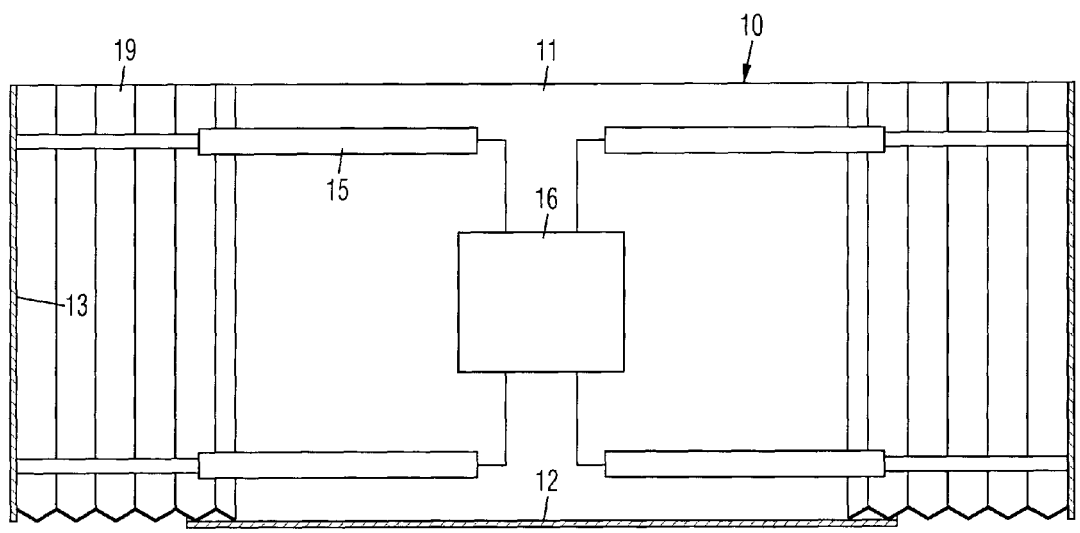
FIG. 4 is an end sectional view of the embodiment of FIG. 3 in an expanded condition.

In this example, expandable seal 14 is comprised of sliding vertical plates 17 (one shown) which are fixed to the ends of side walls 13 and movably positioned flat against respective end walls 11, and a sliding horizontal plate 18 which is fixed to the bottom of side wall 13 and movably positioned flat against bottom 12. Side walls 13 are shown in FIG. 1 retracted for minimizing the width of container 10. Vertical plates 17 and horizontal plate 18 are slid inward when side walls 13 are retracted. The compacted width of container 10 is preferably about 8 feet for being towed on public roads. As shown in FIG. 2, actuators 15 are operable to move side walls 13 outward for increasing the fluid capacity of container 10. The maximum expanded width of container 10 is preferably about 12 feet. Alternatively, container 10 may have different retracted and expanded dimensions.

Container 10 may be compacted for transport to a fire site by road, and place on the ground for receiving water sucked from a nearby water source or dropped from a helicopter through its open top for fire fighting. Side walls 13 may be expanded for increasing fluid capacity.

FIGS. 3–4:

An alternative embodiment of the expandable seal is comprised of a flexible bellows 19 with an outer edge attached to side walls 13, and an inner edge attached to end walls 11 and bottom 12. Bellows 19 is lengthened when side walls 13 are moved outward, and shortened when side walls 13 are moved inward.

Figure 5:
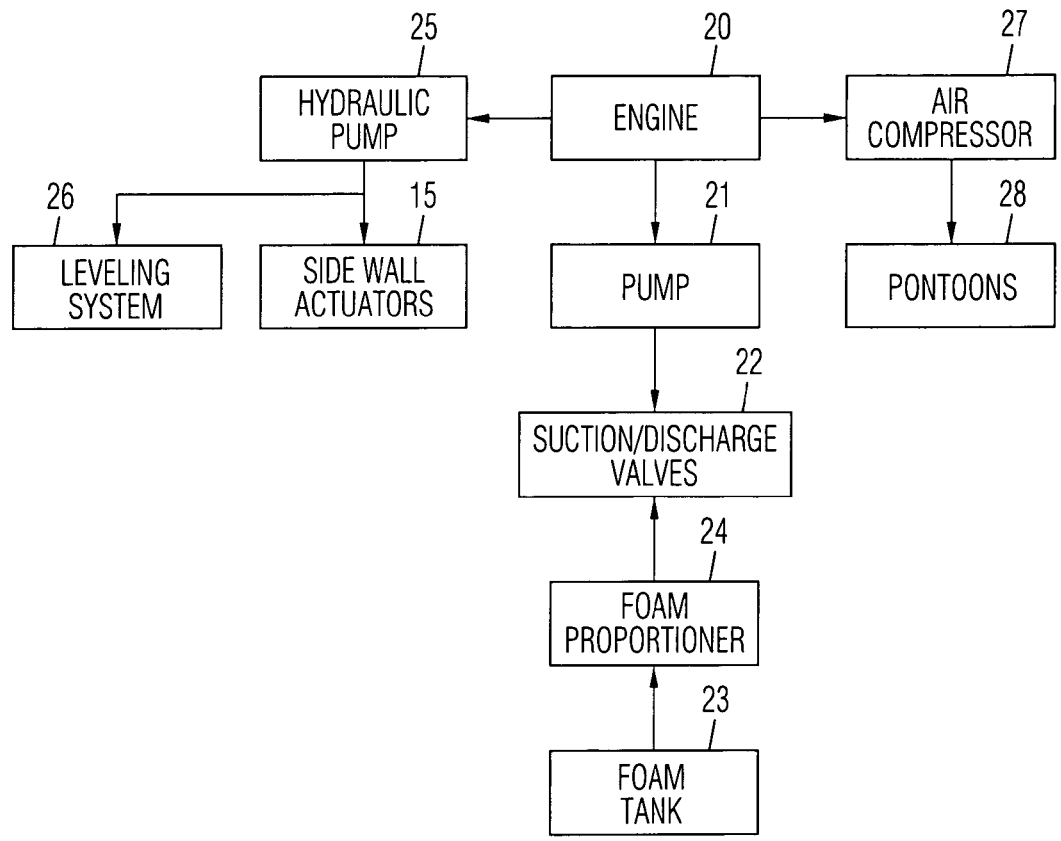
FIG. 5 is a schematic thereof.
Figure 6:
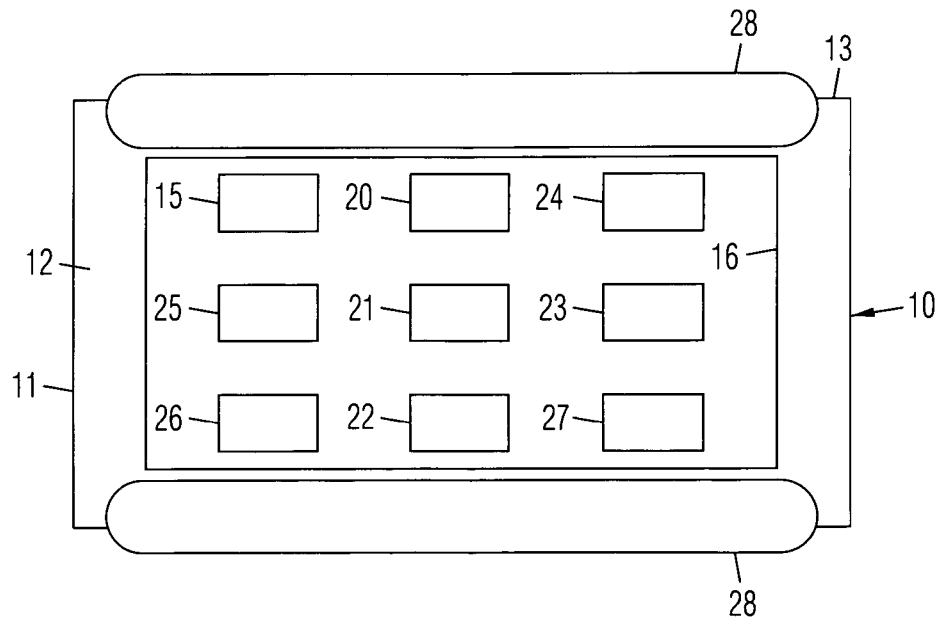
FIG. 6 is a bottom view thereof.

FIGS. 5–6:

In the schematic of the fire-fighting fluid container in FIG. 5 and the bottom view thereof in FIG. 6, an engine 20 and a pump 21 are positioned inside equipment compartment 16.

Pump 21 is driven by engine 20, and is connected to a suction/discharge valve 22 for sucking water from a nearby water source to fill the container 10, or discharging the water stored in the container for dousing a fire. A fire-retardant foam tank 23 is connected to a foam proportioner 24, which is also connected to valve 22. A hydraulic pump 25 powered by engine 20 is connected to actuators 15 for extending the side walls. Alternatively, actuators 15 may be electrically powered by a battery or generator. Hydraulic pump 25 is also connected to a leveling system 26, such as vertical jacks, for stably positioning the container on uneven ground. An air compressor 27 powered by engine 20 is connected to inflatable pontoons 28 attached to the container for floatation.

Although the above description is specific, it should not be considered as a limitation on the scope of the invention, but only as an example of the preferred embodiment. Many variations are possible within the teachings of the invention. For example, wheels may be added for towing behind a vehicle. Therefore, the scope of the invention should be determined by the appended claims and their legal equivalents, not by the examples given.

I claim:

1. An expandable fire-fighting fluid container, comprising:
   opposite end walls;
   a bottom connected between said end walls;
   opposite side walls between said end walls;
   expandable seals respectively connecting said side walls to said end walls and said bottom;
   actuators connected to said side walls and arranged to retract said side walls inwardly to reduce container width, and to expand said side walls outwardly to increase container capacity; and
   a pump in an equipment compartment in said container for pumping a fluid from said container for dousing fire.

2. The expandable fire-fighting container of claim 1, further including an engine in an equipment compartment in said container, a pump powered by said engine and connected to said container for pumping a fluid from said container for dousing fire, a discharge valve connected to said pump, a foam tank connected to a foam proportioner wherein said foam proportioner is connected to said discharge valve, and a hydraulic pump powered by said engine and connected to said actuators, wherein said actuators are comprised of hydraulic jacks.

3. The expandable fire-fighting container of claim 1, further including a leveling system attached to said container for positioning on uneven ground.

4. The expandable fire-fighting container of claim 1, further including inflatable pontoons attached to said container, and an air compressor connected to said pontoons.

5. An expandable fire-fighting fluid container, comprising:
   opposite end walls;
   a bottom connected between said end walls;
   opposite side walls between said end walls;
   expandable seals respectively connecting said side walls to said end walls and said bottom, wherein said expandable seals are each comprised of sliding vertical plates attached to opposite ends of a corresponding side wall and positioned flat against respective end walls, and a horizontal plate attached to a bottom of said corresponding side wall and positioned flat against said bottom; and
   actuators connected to said side walls and arranged to retract said side walls inwardly to reduce container width, and to expand said side walls outwardly to increase container capacity.

6. The expandable fire-fighting fluid container of claim 5, further including a pump in an equipment compartment in said container for pumping a fluid from said container for dousing fire.

7. The expandable fire-fighting container of claim 5, further including an engine in an equipment compartment in said container, a pump powered by said engine and connected to said container for pumping a fluid from said container for dousing fire, a discharge valve connected to said pump, a foam tank connected to a foam proportioner wherein said foam proportioner is connected to said discharge valve, and a hydraulic pump powered by said engine and connected to said actuators, wherein said actuators are comprised of hydraulic jacks.

8. The expandable fire-fighting container of claim 5, further including a leveling system attached to said container for positioning on uneven ground.

9. The expandable fire-fighting container of claim 5, further including inflatable pontoons attached to said container, and an air compressor connected to said pontoons.

10. An expandable fire-fighting fluid container, comprising:
    opposite end walls;
    a bottom connected between said end walls;
    opposite side walls between said end walls;
    expandable seals respectively connecting said side walls to said end walls and said bottom, wherein said expandable seals are comprised of flexible bellows respectively connecting said side walls to said end walls and said bottom; and
    actuators connected to said side walls and arranged to retract said side walls inwardly to reduce container width, and to expand said side walls outwardly to increase container capacity; and
    a pump in an equipment compartment in said container for pumping a fluid from said container for dousing fire.

11. The expandable fire-fighting container of claim 10, further including an engine in an equipment compartment in said container, a pump powered by said engine and connected to said container for pumping a fluid from said container for dousing fire, a discharge valve connected to said pump, a foam tank connected to a foam proportioner wherein said foam proportioner is connected to said discharge valve, and a hydraulic pump powered by said engine and connected to said actuators, wherein said actuators are comprised of hydraulic jacks.

12. The expandable fire-fighting container of claim 10, further including a leveling system attached to said container for positioning on uneven ground.

13. The expandable fire-fighting container of claim 10, further including inflatable pontoons attached to said container, and an air compressor connected to said pontoons.

* * * * *